United States Patent
Maruta et al.

(10) Patent No.: US 7,911,695 B2
(45) Date of Patent: Mar. 22, 2011

(54) REFLEX-TYPE SCREEN, SCREEN APPARATUS, AND SHEET-LIKE ARTICLE

(75) Inventors: Hajime Maruta, Niigata (JP); Tadao Matsuki, Niigata (JP); Shinya Ishida, Niigata (JP); Takahito Tanabe, Niigata (JP); Kiyoshi Numata, Kanagawa (JP)

(73) Assignee: Arisawa Mfg. Co., Ltd., Niigata (JP)

( * ) Notice: Subject to any disclaimer, the term of this patent is extended or adjusted under 35 U.S.C. 154(b) by 253 days.

(21) Appl. No.: 12/324,852

(22) Filed: Nov. 27, 2008

(65) Prior Publication Data

US 2009/0141348 A1  Jun. 4, 2009

(30) Foreign Application Priority Data

Nov. 30, 2007 (JP) .................. 2007-311698

(51) Int. Cl.
*G03B 21/56* (2006.01)
(52) U.S. Cl. ...................................... 359/461
(58) Field of Classification Search .......... 359/443, 359/461; 160/238
See application file for complete search history.

(56) References Cited

U.S. PATENT DOCUMENTS

| | | | | |
|---|---|---|---|---|
| 5,337,179 A | * | 8/1994 | Hodges | 359/443 |
| 5,456,967 A | * | 10/1995 | Nezu | 428/141 |
| 5,778,580 A | * | 7/1998 | Zarelius | 40/610 |
| 6,466,369 B1 | * | 10/2002 | Maddock | 359/460 |
| 2009/0159218 A1 | * | 6/2009 | Duineveld | 160/121.1 |

FOREIGN PATENT DOCUMENTS

| | | |
|---|---|---|
| JP | 3103802 | 4/1991 |
| JP | 2005-208558 | 8/2005 |

* cited by examiner

*Primary Examiner* — Christopher Mahoney
(74) *Attorney, Agent, or Firm* — Jianq Chyun IP Office

(57) ABSTRACT

The present invention provides a reflex-type screen which is wound up by a winding shaft to be retracted and is unwound from the winding shaft in use. The reflex-type screen comprises a reflection layer which reflects an incident light, a transparent surface protective layer provided on a first surface of the reflection layer, and a back surface protective layer provided on a second surface of the reflection layer, wherein as between the surface protective layer and the back surface protective layer, the one that has a higher loop stiffness value, faces inward when the reflex-type screen is wound up by the shaft.

10 Claims, 10 Drawing Sheets

REFLEX-TYPE SCREEN, SCREEN APPARATUS, AND SHEET-LIKE ARTICLE

CROSS REFERENCE TO RELATED APPLICATION

The present application claims priority from a Japanese Patent Application No. 2007-311698 filed on Nov. 30, 2007, the contents of which are incorporated herein by reference.

BACKGROUND

1. Technical Field

The present invention relates to a reflex-type screen and a screen apparatus. More specifically, the invention relates to a projection screen on which images are projected by a projector and the like, and a retractable projection screen apparatus.

2. Related Art

A reflex-type screen is conventionally used as a projection screen on which images are projected by a liquid crystal projector and the like. The screen reflects a light projected on the surface of the screen, and viewers observe the reflected light. Japanese Patent No. 3103802,for example, discloses a projection screen having an aluminum foil reflecting layer laminated onto a supporting material formed by a PET film, and a diffusing layer made of an OPP film laminated on the reflecting layer. Moreover, Japanese Patent Application Publication No. 2005-208558 describes a reflex-type screen having an aluminum foil reflecting layer provided on a PET film substrate, and a diffusing layer made of a transparent resin film laminated on the reflecting layer.

However, in the case of using these screens in a wind-up retractable screen apparatus, when the reflex-type screen is pulled out from the housing, the wound shape of the screen tends to remain and thus the flatness of the screen is impaired. Furthermore, at an edge of the reflex-type screen to which a winding shaft is jointed or secured, there occurs a step or level difference having a thickness of the screen edge. Therefore, when the reflex-type screen is tightly wound up, the screen is pressed against the step, which may leave a pressed mark on the screen surface. Because of the above-mentioned problems, the conventional reflex-type screens have a problem of unevenness in brightness when projecting an image light.

Another problem arises when the stiffness of the screen is increased in order to prevent the wound shape or the pressed mark of the screen. Increased stiffness requires higher torque for winding the screen, which means the screen has to be wound tightly with a strong force. Accordingly, the wound shape or the pressed mark cannot be prevented effectively. Meanwhile, when the stiffness of the screen is increased in order to reduce the wound shape or the pressed mark, the screen cannot be smoothly wound up. Although it may be effective to extend the external diameter of the winding shaft in order to solve the above-mentioned problem, another problem arises that the size of the screen apparatus becomes large.

SUMMARY

It is an object of an aspect of the innovations herein to provide a reflex-type screen and a screen apparatus being capable of solving the above-mentioned problems.

More specifically, one exemplary of a reflex-type screen according to a first aspect of the innovations herein is a reflex-type screen wound up by a winding shaft to be retracted in a housing, and unwound from the winding shaft in use. The reflex-type screen includes a reflection layer that reflects an incident light, a transparent surface protective layer provided on a first surface of the reflection layer, and a back surface protective layer provided at a second surface of the reflection layer, wherein as between the surface protective layer and the back surface protective layer, the one that has a higher loop stiffness value, faces inward when the reflex-type screen is wound up by the shaft.

One exemplary of a screen apparatus according to a second aspect of the innovations herein is a screen apparatus that includes a winding shaft, and a reflex-type screen wound up by the winding shaft to be retracted in a housing and unwound from the housing in use. The reflex-type screen includes a reflection layer that reflects an incident light, a transparent surface protective layer provided on a first surface of the reflection layer, and a back surface protective layer provided at a second surface of the reflection layer, wherein the reflex-type screen is wound up in such a way that one of the surface protective layer and the back surface protective layer whichever has a higher loop stiffness value faces inward.

One exemplary of a sheet-like article according to a third aspect of the innovations herein is a sheet-like article that includes a first layer, and a second layer having a higher loop stiffness value than that of the first layer, wherein the sheet-like article is wound up in such a way that the first layer faces inward.

The summary clause does not necessarily describe all necessary features of the embodiments of the present invention. The present invention may also be a sub-combinations of the features described above. The above and other features and advantages of the present invention will become more apparent from the following description of the embodiments taken in conjunction with the accompanying drawings.

DESCRIPTION OF EXEMPLARY EMBODIMENTS

Hereinafter, some aspects of the present invention will now be described based on the preferred embodiments, which do not intend to limit the scope of the invention, but exemplify the invention. All of the features and the combinations thereof described in the embodiments are not necessarily essential for solving the problems of the invention.

Figure 1:
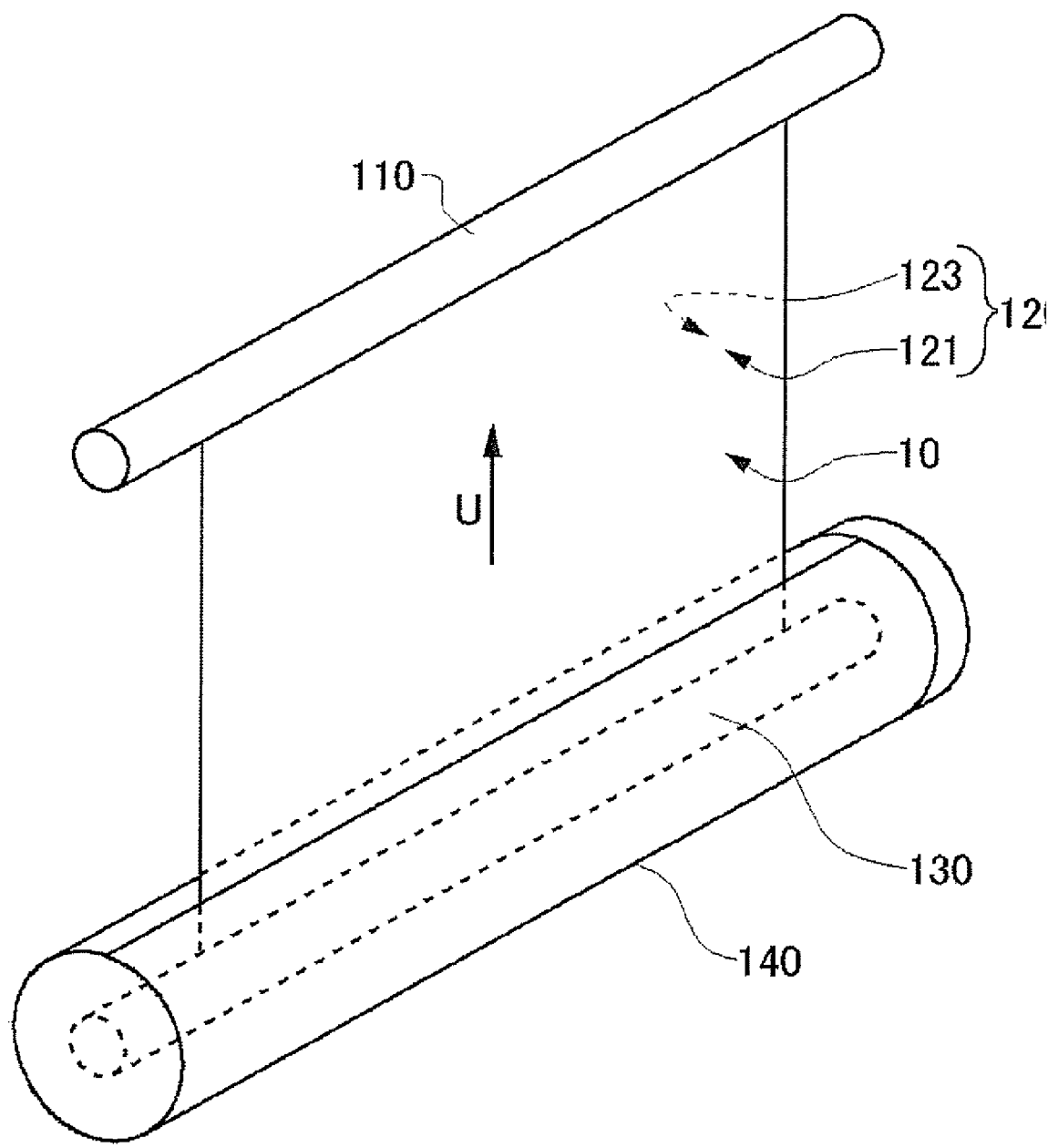
FIG. 1 is a perspective view of a screen apparatus having a reflex-type screen in usage state.

FIG. 1 is a perspective view of a screen apparatus 100 having a reflex-type screen 120 while in use according to one embodiment of the present embodiment. Hereinafter, the horizontal direction means the direction in which a slide-out bar 110 and a storing housing 140 extend (axial direction), while the vertical direction means the direction in which the reflex-type screen 120 is pulled out, shown as "U" in the figure. However, the description herein does not limit the use of the reflex-type screen 120 and the screen apparatus 100 to these directions.

As shown in FIG. 1, the screen apparatus 100 has a cylindrical slide-out bar 110 and a cylindrical storing housing 140, both extending in the horizontal direction. In the storing housing 140, a cylindrical winding shaft 130 extending in the horizontal direction is provided. The winding shaft 130 may be an aluminum pipe with a diameter of 35 mm, for example. The upper and lower edges of the reflex-type screen 120 in the vertical direction are jointed to the slide-out bar 110 and the winding shaft 130 respectively, and the width direction of the reflex-type screen 120 is set to be parallel to the axial direction of the slide-out bar 110 and the winding shaft 130.

The reflex-type screen 120 is wound up by the winding shaft 130 and retracted in the storing housing 140. When the screen is in use, the slide-out bar 110 is pulled up so that the screen is unrolled from the winding shaft 130. The reflex-type screen 120 reflects an incident light 10 projected by a liquid crystal projector and the like toward a viewing surface 121. At a back surface 123, the screen may include a light-absorbing layer to absorb a part of the incident light 10, or a light-blocking layer to block any light entering from the back surface 123.

Figure 2:
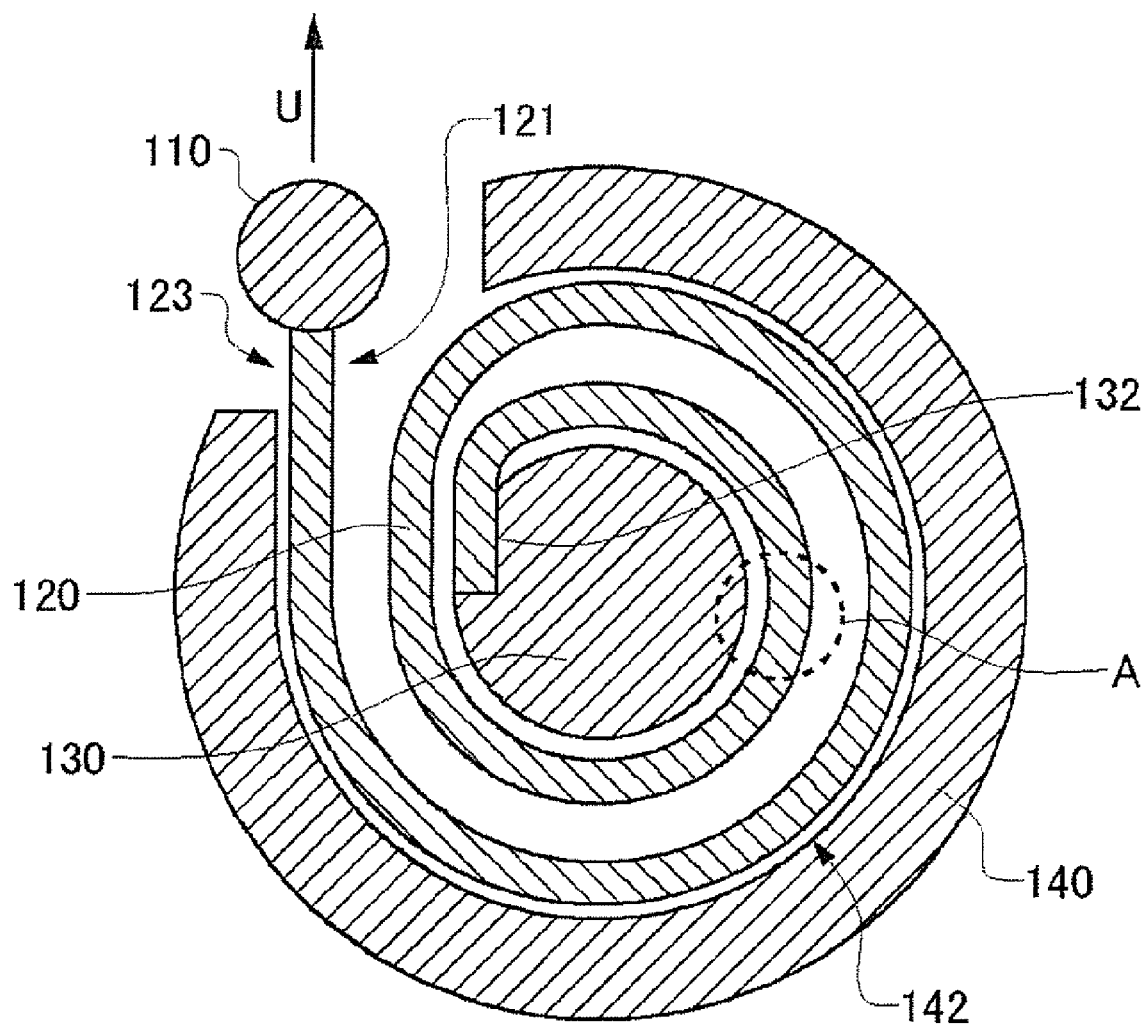
FIG. 2 is a cross-sectional diagram of the screen apparatus with the reflex-type screen in a retracted state.

FIG. 2 is a cross-sectional diagram of the screen apparatus 100 with the reflex-type screen 120 retracted in the housing. The reflex-type screen 120 having the viewing surface 121 and the back surface 123 is wound up by the winding shaft 130 in such a way that the viewing surface 121 faces inward. The winding shaft 130 has a jointed portion 132 where the reflex-type screen 120 is jointed or secured to the outer circumferential surface of the shaft. The jointed portion 132 is formed by cutting away or grinding down the joint portion of the winding shaft 130 whose thickness is substantially equal to the thickness of the screen 120, so that the height difference between the edge of the reflex-type screen 120 and the winding shaft 130 at the jointed portion 132 is reduced. Accordingly, even if the screen 120 is wound up tightly, the pressed mark due to being pressed against level difference between the screen and the shaft can be effectively prevented.

Moreover, a lining may be provided on an inside surface 142 of the storing housing 140 in order to prevent the reflex-type screen 120 from being spotted or damaged. The lining material may be an unwoven fabric, a raising fabric, a foamed polyurethane sheet, a foamed polyolefin sheet and the like.

Figure 3:
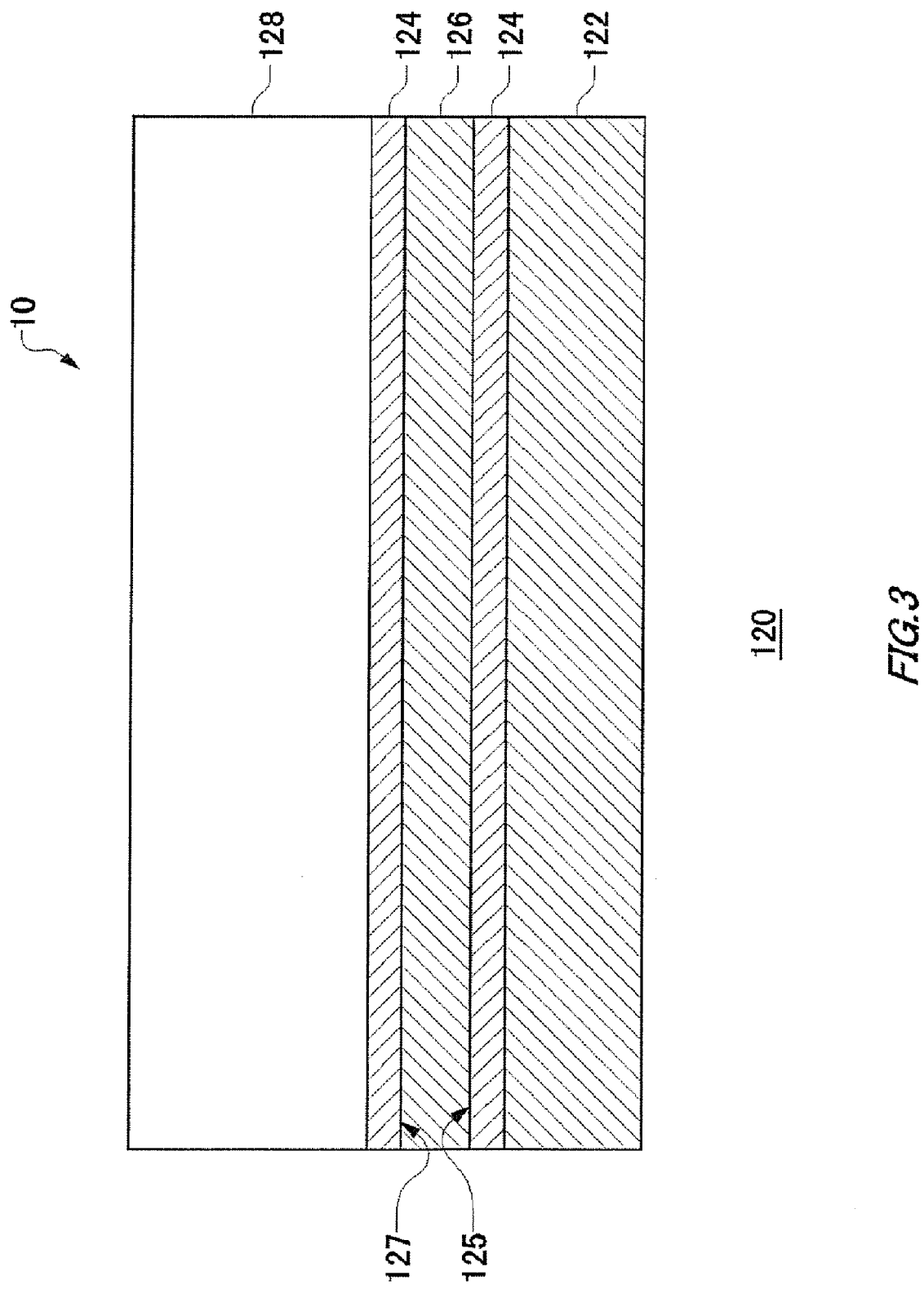
FIG. 3 is a cross-sectional diagram of a structure of the reflex-type screen.

FIG. 3 is a cross-sectional diagram of the structure of the reflex-type screen 120. As shown in the figure, the reflex-type screen 120 comprises a reflection layer 126 that reflects the incident light 10, a transparent surface protective layer 128 provided on a first surface 127 of the reflection layer 126, and a back surface protective layer 122 provided on a second surface 125 of the reflection layer 126. When the reflex-type screen 120 is wound up by the winding shaft 130 to be retracted in the storing housing 140, either the back surface protective layer 122 or the surface protective layer 128, whichever has a higher loop stiffness value faces inward.

Here, the loop stiffness value is a measurement value obtained by measuring a sample with a Loop Stiffness Tester, DA type, manufactured by Toyo Seiki Seisaku-sho, Ltd. The reflex-type screen 120 is cut into a sample of 3 mm in width and 150 mm in length, and the sample is used for measuring the loop stiffness value. The Loop Stiffness Tester, DA type, sets a loop length of the sample at 60 mm first, and then measures the load applied to the sample to compress until the distance in the compressed direction becomes 10 mm, with a speed of 3.3 mm/min., so that the loop stiffness value can be calculated. The loop stiffness value represents the magnitude of resistance of the sample against being crushed in a loop state.

The loop stiffness value varies according to the thickness of the sample, the material used for the sample, temperature, and/or humidity. For example, when the same material is used for samples, the thicker the sample is, the higher the loop stiffness value becomes. Moreover, when the thickness of the samples is the same, the loop stiffness value is lower in Polycarbonate (PC) than in polyphenylene sulfide (PPS), which is lower than in polyethylene terephthalate (PET), and which is lower in polyethylene naphthalate (PEN) materials. When the sample is a plastic film, the loop stiffness value in the traverse direction is a little higher than that in the machine direction.

As described above, in the reflex-type screen 120, either the back surface protective layer 122 or the surface protective layer 128, whichever has a higher loop stiffness value faces inward by the winding shaft 130. Accordingly, a reflex-type screen 120 that can be easily wound up by the winding shaft 130 and has reduced wound shape when unrolled from the winding shaft 130 can be provided.

Figure 4:
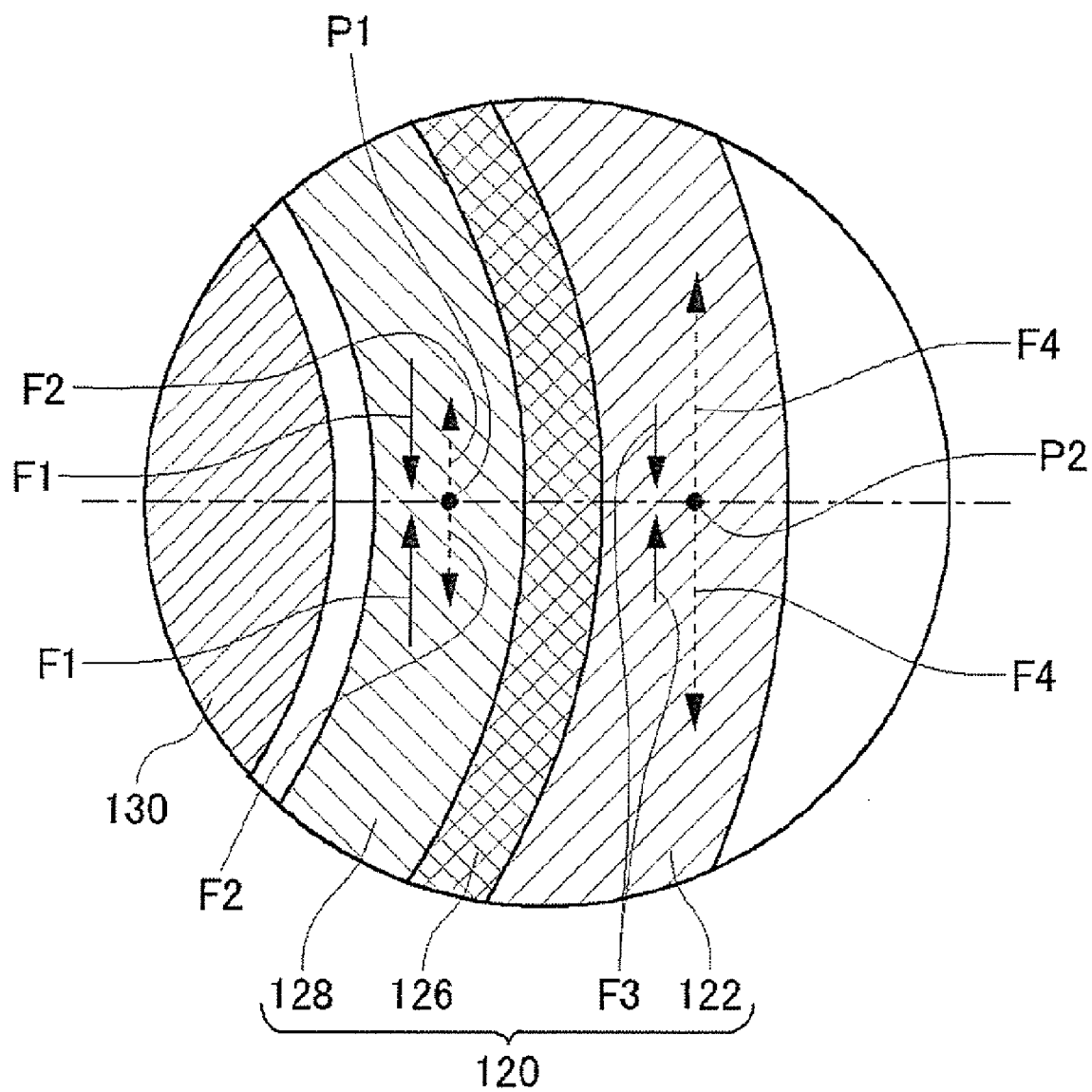
FIG. 4 is an enlarged cross-sectional diagram of the reflex-type screen in a retracted state.

FIG. 4 is an enlarged cross-sectional diagram of a part "A" of the reflex-type screen 120 when the screen 120 is wound up by the winding shaft 130 to a retracted state as in FIG. 2. In the figure, the reflex-type screen is wound up by the winding shaft 130 with the surface protective layer 128 facing inward. A compression force F1 and a tensile force F2 act at a point P1 on the surface protective layer 128, and a compression force F3 and a tensile force F4 act at a point P2 on the back surface protective layer 122.

When the reflex-type screen 120 is wound up by the winding shaft 130, the closer the screen is to the shaft, the weaker the tensile force is and the stronger the compression force is. A similar phenomenon can be observed in each layer of the reflex-type screen 120. When the surface protective layer 128 is placed closer to the winding shaft 130 (i.e., facing inward), and the back surface protective layer 122 is placed closer to the storing housing 140 (i.e., facing outward), for example, a strong compression force F1 acts on the surface protective layer 128, which causes a problem of wound shape of the screen. If the loop stiffness value is high in the surface protective layer 128, a repulsion force acts on the compression force to restore the original state of the layer 128. Accordingly, since the repulsion force counteracts the compression force F1, the problem of wound shape of the screen is not likely to occur.

Additionally, when the reflex-type screen 120 is wound up by the winding shaft 130, the closer a layer is provided to the winding shaft, the weaker the tensile force is that is applied to the layer. When a tensile force is applied to a plastic film for a long time, the film may generate the creep deformation. However, when the plastic film is wound up by the winding shaft 130, because the tensile force of the inside layer is weaker than that of the outside layer, a problem of the creep deformation rarely occurs. In the reflex-type screen of the present embodiment, since the screen is wound up in such a way that the layer having a higher loop stiffness value is facing inward, the tensile force applied to that layer can be made small. Therefore, it is possible to prevent the creep deformation of the layer having a high loop stiffness value.

Since the reflection layer 126 is made of metal such as aluminum foil, plastic deformation occurs more easily than in the back surface protective layer 122 or the surface protective layer 128.

Here, the surface protective layer 128 has a higher loop stiffness value than that of the back surface protective layer 122, and thus when the screen is wound up by the winding shaft, the surface protective layer is provided facing inward. Accordingly, because the surface protective layer 128 is provided facing inward when the reflex-type screen 120 is wound up, the surface protective layer 128, to which an image is projected while the screen is in use, can be prevented from being spotted or damaged. Specifically, in the present embodiment, it is preferred that the screen is wound up in such a way that the surface protective layer 128 is facing inward, as the screen has a strong force to keep its flatness and it tends to unroll inside the housing 140.

The back surface protective layer 122 and the surface protective layer 128 may be both made of the same material, and the surface protective layer 128 may be thicker than the back surface protective layer 122. If this is the case, the properties of a layer provided on the first surface 127 and a layer provided on the second surface 125 of the reflection layer 126 are the same as or similar to those in the case of using different materials. In particular, the same chemical properties such as chemical resistance and water absorbability, which do not depend on the thickness of the material, can be obtained for both sides 125 and 127 of the reflection layer 126.

Accordingly, in the case of attaching the back surface protective layer 122 to the reflection layer 126, and the surface protective layer 128 to the reflection layer 126, the same adhesive or glue can be used. Moreover, as the thermal properties such as the coefficient of thermal expansion, the coefficient of thermal contraction, and the heatproof temperature are almost the same, manufacturability is improved when integrally-manufacturing the reflex-type screen 120. In particular, when the reflection layer 126 is made of an aluminum foil, the occurrence of wrinkles can be prevented.

Furthermore, because the surface protective layer 128 is thick and the loop stiffness thereof is high, the shape of the level difference (or the step) between the winding shaft 130 and the reflective type screen 120 at the jointed portion is not likely to be transferred or reflected to the screen 120. As a result, the pressed mark can be effectively prevented.

The term "the same materials" used herein means materials of which the main components are the same. For example, a transparent polyethylene terephthalate film (PET film) and a black PET film containing black coating components such as carbon black microparticles, or a PET film containing a light diffusion material such as silica microparticles are classified as "the same materials." A PET film with surface treatment and a PET film without surface treatment are also classified as "the same materials."

The surface protective layer 128 may be surface-treated so as to have a light diffusion property or an anti-glare property. The anti-glare treatment may be a coating treatment, for example. The light diffusion treatment may be a sand-mat treatment, an embossing treatment, and the like. In the case of the coating treatment, a resin containing fillers is applied on the surface of the surface protective layer 128, so that the thickness of the protective layer increases in whole when compared with the thickness of the untreated protective layer. Meanwhile, in the case of the sand-mat treatment or the embossing treatment, parts of the surface protective layer 128 are removed, so that the protective layer 128 has the parts with a reduced thickness when compared to the original surface. However, even in this treatment, since some of the other parts of the surface retain their original thickness, thickness of the thickest portion of the treated surface is almost the same as that of the original surface. Therefore, even though there may be cases where some portions are removed by the treatment and thus the thickness of the layer at those portions is reduced, the treated surface protective layer 128 and the untreated surface protective layer 128 are described as having "the same thickness" in the present application.

Similarly, the back surface protective layer 122 and the surface protective layer 128 are made of the same material. The surface protective layer 128 has a thickness that is equal to or more than that of the back surface protective layer 122. When the screen is wound up by the winding shaft 130, the surface protective layer 128 may be provided facing inward. Accordingly, the wound shape of the screen and the pressed mark can be effectively prevented in the reflex-type screen 120.

A plastic film is used for the back surface protective layer 122, for example. The plastic film material may be PET, PEN, PC, PPS, polypropylene (PP), a cellulose derivative such as tri-acetylcellulose (TAC), an acrylic resin, or a polyvinyl chloride, for example. The plastic film may be obtained by elongating or diluting in a solvent the aforementioned resin, forming it into a film confirmation, and drying the film, for example.

The thickness of the back surface protective layer 122 preferably ranges from 12 μm to 150 μm. If the thickness is less than 12 μm, wrinkles tend to occur when attaching the layers, and the flatness may be impaired. Meanwhile, if the thickness is more than 150 μm, it becomes hard to wind up the screen. For example, when the screen is wound up with the surface protective layer 128 facing inward, the back surface protective layer 122 may be a PET film having a thickness ranging from 12 μm to 75 μm. If the thickness is less than 12 μm, wrinkles tend to occur when attaching the layers, and the flatness may be impaired. On the other hand, if the thickness is more than 75 μm, it becomes hard to wind up the screen.

The reflection layer 126 may be made of metal such as an aluminum foil. The back surface protective layer 122 can be attached to the reflection layer 126 by an adhesive layer 124. The adhesive layer 124 can use any adhesive or glue preferably selected depending on the back surface protective layer 122 and the reflection layer 126. The back surface protective layer 122 and the reflection layer 126 are integrally-manufactured by a dry-laminate process, for example.

The reflection layer 126 may be an aluminum foil having a thickness of 7 μm to 20 μm, more preferably 7 μm to 15 μm. If the thickness is more than 20 μm, the stiffness thereof becomes high so that it becomes difficult to wind up the screen and to restore the original shape of the screen in case of deformation. Meanwhile, if the thickness is less than 7 μm, it is difficult to attach the layers together without wrinkles.

The reflection layer 126 can be obtained by depositing or sputtering a metal film on the back surface protective layer 122. The reflection layer 126 may be an optical multilayer film comprising an optical film having a high refractive index material, such as niobium pentoxide, titanium dioxide, or tantalum pentoxide, and another optical film having a low refractive index material, such as silicon dioxide or magnesium fluoride.

The surface protective layer 128 may be a plastic film, for example. The plastic film is made of polyethylene terephthalate (PET), polyethylene naphthalate (PEN), polycarbonate (PC), polyphenyl sulfide (PPS), polypropylene (PP), a cellulose derivative such as tri-acetylcellulose (TAC), an acrylic resin, or a polyvinyl chloride, for example. The plastic film may be obtained by elongating or diluting in a solvent the aforementioned resin, forming it into a film confirmation, and drying the film, for example.

The thickness of the surface protective layer 128 preferably ranges from 12 μm to 150 μm. If the thickness is less than 12 μm, wrinkles tend to occur when attaching the layers, and the flatness may be impaired. On the other hand, if the thickness is more than 150 μm, it becomes hard to wind up the screen. For example, when the screen is wound up with the surface protective layer 128 facing inward, the surface protective layer 128 may be a PET film having a thickness of more than 75 μm and less than 150 μm. If the thickness is less than 75 μm, wrinkles sometimes occur. If the thickness is more than 150 μm, it becomes difficult to wind up the screen easily.

The surface protective layer 128 can be attached to the reflection layer 126 by the adhesive layer 124. The adhesive layer 124 can use any adhesive or glue preferably selected depending on the surface protective layer 128 and the reflection layer 126. The back surface protective layer 122 and the reflection layer 126 are integrally-manufactured by a dry-laminate process, for example.

The surface protective layer 128 may include a light diffusion material such as acrylic beads, styrene beads, or silicone beads. As a result, a reflected light from the reflection layer 126 diffuses in the surface protective layer 128, so that any pressed mark becomes less noticeable.

The overall thickness of the reflex-type screen 210 is preferably set considering the handiness of winding and restorability of the screen when unrolled. If the overall thickness of the reflex-type screen 210 is small, the overall loop stiffness value is low. This makes the screen frangible, and when unrolled from the housing, the screen is difficult to restore its original flatness. Meanwhile, if the overall thickness of the reflex-type screen 210 is large, the overall loop stiffness value is high, which means that the screen becomes hard to be wound up. Although it may be possible to solve this problem by increasing the torque for winding up and/or the external diameter of the winding shaft 130, this brings another problem that the size of the screen apparatus becomes large. Specifically considering these problems, when the external diameter of the winding shaft 130 is 35 mm, it is preferred to set the thickness of the reflex-type screen 210 so that the overall loop stiffness value ranges from 300 mN to 500 mN.

Figure 5:
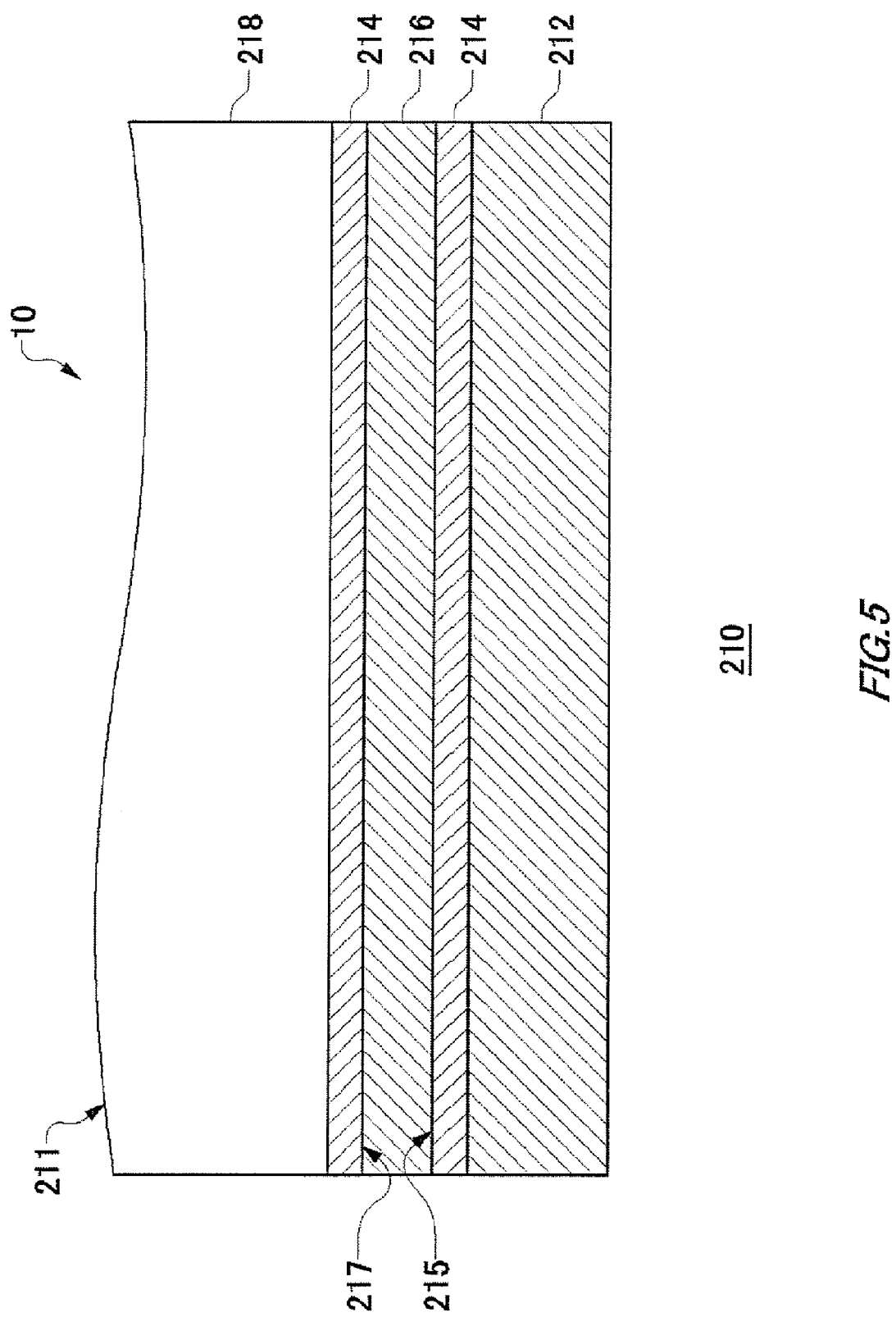
FIG. 5 is a cross-sectional diagram of a structure of the reflex-type screen according to another embodiment of the present invention.

FIG. 5 is a cross-sectional diagram of a structure of a reflex-type screen 210 according to another embodiment of the present invention. As shown in the figure, the reflex-type screen 210 comprises a reflection layer 216 that reflects the incident light 10, a transparent surface protective layer 218 provided on a first surface 217 of the reflection layer 216, and a back surface protective layer 212 provided on a second surface 215 of the reflection layer 216. The loop stiffness value of the surface protective layer 218 is higher than that of the back surface protective layer 212. When the reflex-type screen 210 is wound up by the winding shaft 130 to be retracted in the storing housing 140, the back surface protective layer 212 is provided so as to face inward.

The back surface protective layer 212 and the surface protective layer 218 may be attached to the reflection layer 216 by the adhesive layers 214. The adhesive layer 214 can use any adhesive or glue preferably selected depending on the back surface protective layer 212, the reflection layer 216, and the surface protective layer 218. The back surface protective layer 212, the reflection layer 216, and the surface protective layer 218 are integrally-manufactured by a dry-laminate process, for example.

The surface protective layer 218 in the reflex-type screen 210 may have an exposing surface 211 that is surface-treated by an anti-glare treatment such as a mat treatment. As a result, a reflected light from the reflection layer 216 diffuses in the exposing surface 211, so that any pressed mark becomes less noticeable.

Figure 6:
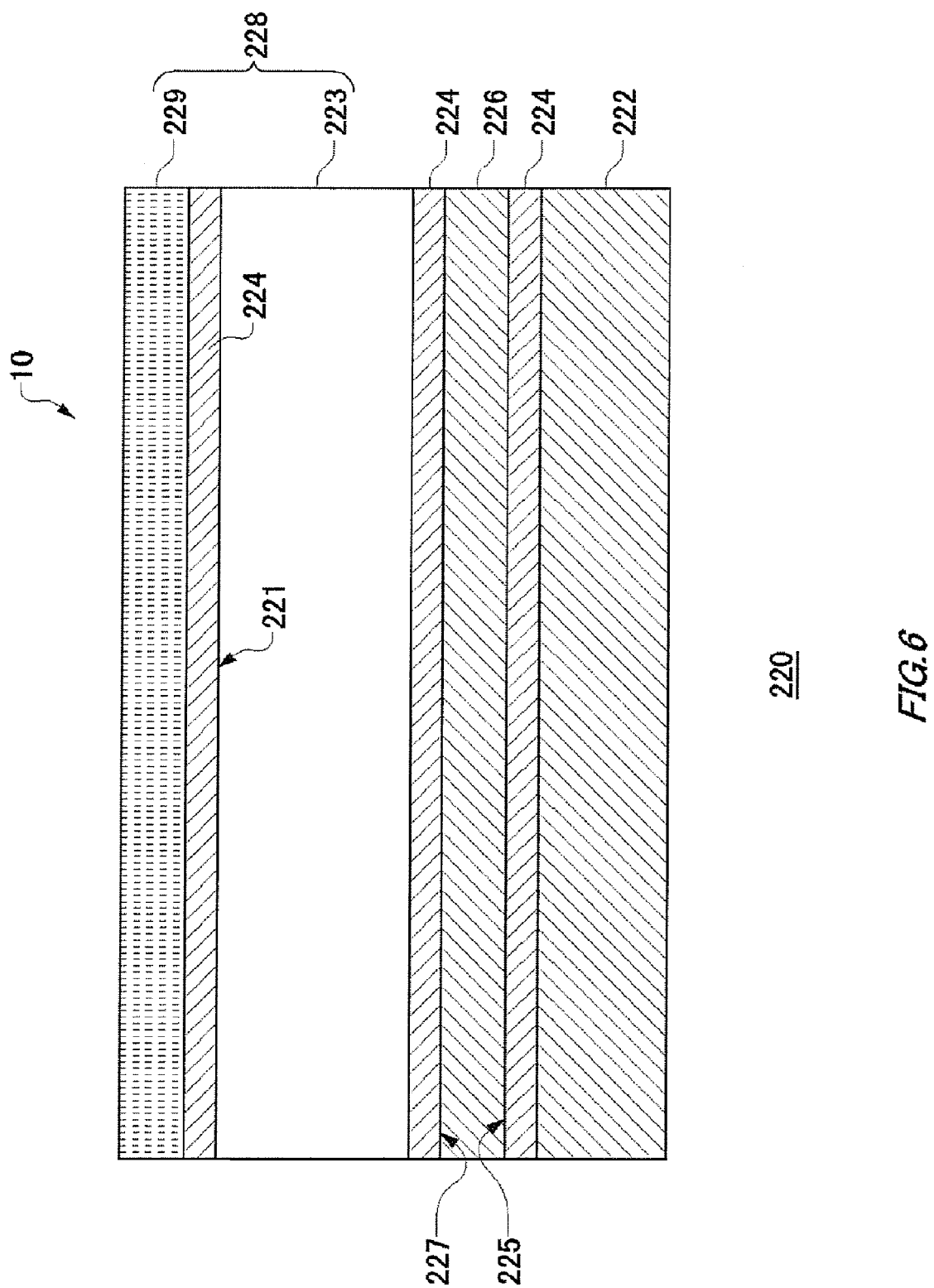
FIG. 6 is a cross-sectional diagram of a structure of the reflex-type screen according to another embodiment of the present invention.

FIG. 6 is a cross-sectional diagram of a structure of a reflex-type screen 220 according to another embodiment of the present invention. As shown in the figure, the reflex-type screen 220 comprises a reflection layer 226 that reflects the incident light 10, a transparent surface protective layer 228 provided on a first surface 227 of the reflection layer 226, and a back surface protective layer 222 provided on a second surface 225 of the reflection layer 226. The loop stiffness value of the surface protective layer 228 is higher than that of the back surface protective layer 222. When the reflex-type screen 220 is wound up by the winding shaft 130 to be retracted in the storing housing 140, the surface protective layer 228 is provided so as to face inward.

The back surface protective layer 222 and the surface protective layer 228 may be attached to the reflection layer 226 by the adhesive layers 224. The adhesive layer 224 can use any adhesive or glue preferably selected depending on the back surface protective layer 222, the reflection layer 226, and the surface protective layer 228. The back surface protective layer 222, the reflection layer 226, and the surface protective layer 228 are integrally-manufactured by a dry-laminate process, for example.

Moreover, the surface protective layer 228 may include a surface protective layer main body 223 and a light diffusion film 229 provided on a surface 221 opposite to the reflection layer 226 for diffusing light. In other words, the main body 223 of the surface protective layer and the light diffusion film 229 are provided in this order in the direction away from the reflection layer 226. As a result, a reflected light from the reflection layer 226 diffuse in the light diffusion film 229, so that any pressed mark becomes less noticeable.

Figure 7:
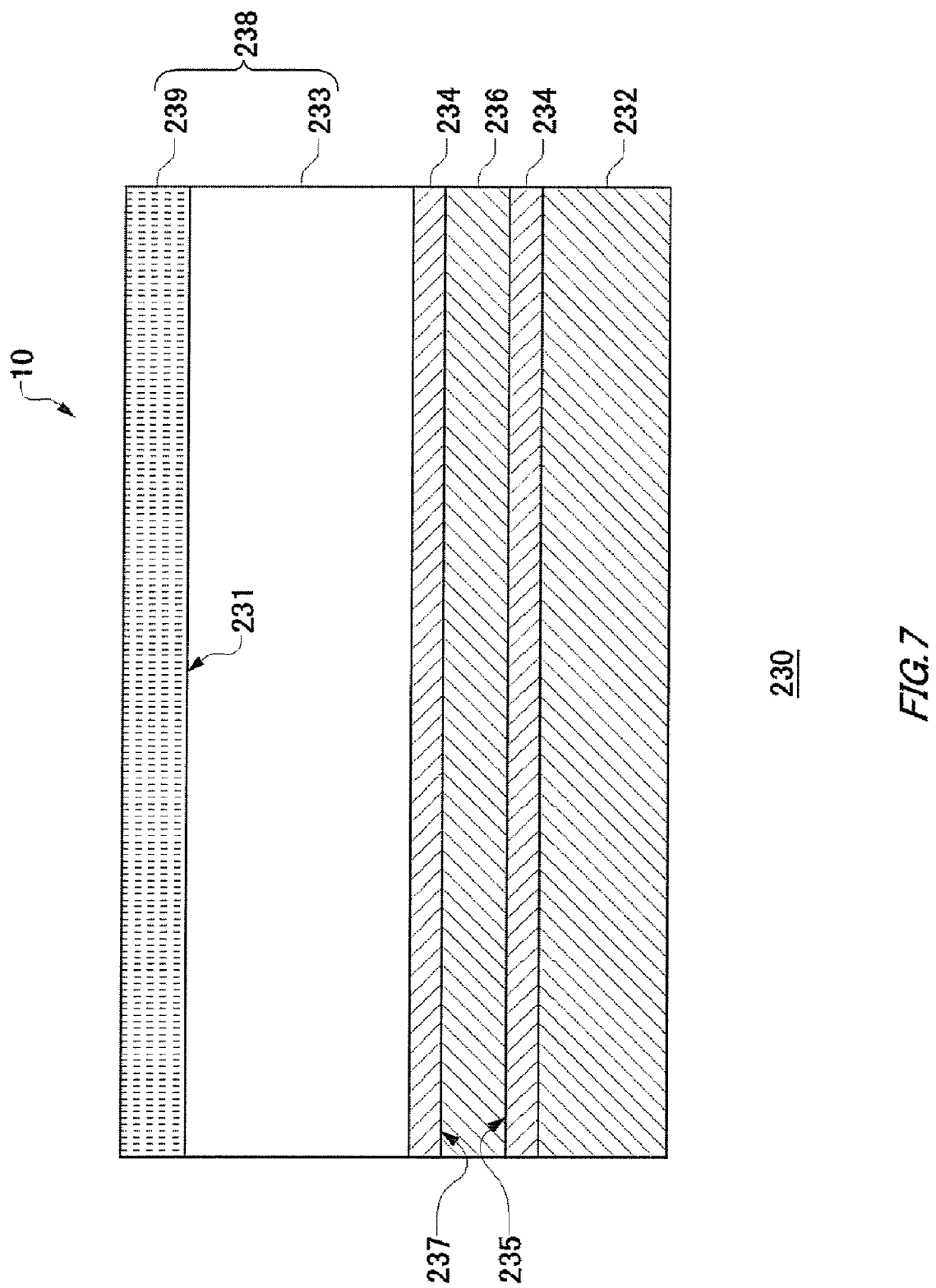
FIG. 7 is a cross-sectional diagram of a structure of the reflex-type screen according to another embodiment of the present invention.

FIG. 7 is a cross-sectional diagram of a structure of a reflex-type screen 230 according to another embodiment of the present invention. As shown in the figure, the reflex-type screen 230 comprises a reflection layer 236 that reflects the incident light 10, a transparent surface protective layer 238 provided on a first surface 237 of the reflection layer 236, and a back surface protective layer 232 provided on a second surface 235 of the reflection layer 236. The loop stiffness value of the surface protective layer 238 is higher than that of the back surface protective layer 232. When the reflex-type screen 230 is wound up by the winding shaft 130 to be retracted in the storing housing 140, the surface protective layer 238 is provided so as to face inward.

The back surface protective layer 232 and the surface protective layer 238 may be attached to the reflection layer 236 by the adhesive layers 234. The adhesive layer 234 can use any adhesive or glue preferably selected depending on the back surface protective layer 232, the reflection layer 236, and the surface protective layer 238. The back surface protective layer 232, the reflection layer 236, and the surface protective layer 238 are integraglly-manufactured by a dry-laminate process, for example.

The surface protective layer 238 has a transparent main body 223 of the surface protective layer and an anti-glare layer 239 that diffuses a light. In the structure shown in FIG. 7, the main body 233 of the surface protective layer and the anti-glare layer 239 are provided in this order in the direction away from the reflection layer 236. The anti-glare layer 239 is formed by coating on the main body 233 of the surface protective layer. In the coating treatment, an anti-glare resin having acrylic beads, styrene beads, or acrylic styrene copolymer beads is applied on a surface 231 of the main body 233 of the surface protective layer. As a result, a reflected light from the reflection layer 236 diffuses in the light diffusion layer 239, so that any pressed mark becomes less noticeable.

Embodiment 1

A reflection layer 216 made of aluminum foil having a thickness of 7 μm is attached to a back surface protective layer 212 made of a PET film (manufactured by Toray Industries, Inc.) having a thickness of 50 μm. On the reflection layer 216, a surface protective layer 218 made of a PET film (manufactured by Toray Industries, Inc.) having a thickness of 75 μm and having a sand-mat treated surface is laminated to form the reflex-type screen 210. The size of the reflex-type screen 210 is 1,771 mm in the horizontal direction and 1,008 mm in the vertical direction.

The back surface protective layer 212 is provided in such a way that the traverse direction of the PET film is congruent with the pulling direction U, and the surface protective layer 218 is provided in such a way that the traverse direction of the PET film is congruent with the pulling direction U. Moreover, the surface protective layer 218 is set so that the surface that is not sand-mat treated is opposed to the reflection layer 216. The back surface protective layer 212, the reflection layer 216, and the surface protective layer 218 are made integral by dry-laminate treatment with urethane adhesives (manufactured by Toyo Ink Mfg. Co., Ltd.) applied evenly between the respective layers.

Table 1 shows the loop stiffness values of the surface protective layer 218, the back surface protective layer 212, and the whole reflex-type screen 210 in the present embodiment. As shown in the table, the loop stiffness value of the surface protective layer 218 is higher than that of the back surface protective layer 212 in the present embodiment. Each loop stiffness value is measured, using samples of the film cut to a length of 150 mm in the traverse direction.

wound up by the winding shaft in such a way that the surface protective layer 218 is facing inward, and the sample is secured with tape so that the sample does not unroll during the examination. The winding shaft is a pipe having an external diameter of 35 mm. The sample is wound up along the pulling direction U, which is the same manner as how the reflex-type screen 210 is wound up.

The wound sample is put into an examination tank with a temperature of 23 degrees and a relative humidity of 50% RH. The sample is left for a certain amount of time, and then taken out from the tank at regular time intervals so as to measure the warpage.

Here, the term "warpage" represents an amount measured by the following steps. The sample is put into the examination tank and left for a certain amount of time. The sample is then taken out from the tank, and the tape securing the screen is removed. The sample is taken off from the winding shaft, and put upright on a glass plate in such a manner that the width direction of the sample is perpendicular to the glass plate to observe the sample as it opens out.

If the sample opens out without being rolled, the sample is placed on the glass plate so that it opens out in a manner that the width direction of the sample is parallel to the glass plate. The sample is opened out in such a way that both edges in the pulling direction (winding direction) rise from the plate. The warpage amount is shown as a positive number or a negative number, where the positive number means that the sample is opened out with the surface protective layer 218 being upward, and the negative number means that the sample is opened out with the back surface protective layer 212 being upward. If the sample curls up and does not open out when it is put upright on the plate in such a manner that the width direction of the sample is perpendicular to the glass plate, the warpage is unmeasurable.

After leaving the sample opened out for one minute, the distances between the glass plate and both sides on the edges of the sample in the pulling direction are measured. As the

TABLE 1

| | Thickness of the screen [μm] | Loop stiffness value [mN] | | | Warpage [mm] Left time [h] | | | | | | Curl in set state [mm] Right/left |
|---|---|---|---|---|---|---|---|---|---|---|---|
| | | Protective layer | Supporting layer | Whole screen | 1 | 8 | 24 | 72 | 168 | 504 | |
| Embodiment 1 | 140 | 62 | 22 | 362 | 18 | 24 | 22 | 34 | 40 | 64 | 8/7 |
| Embodiment 2 | 152 | 200 | 2 | 405 | 63 | 70 | 90 | 99 | 115 | 115 | −8/−6 |
| Comparative example 1 | 162 | X | 299 | 417 | X | X | X | X | X | X | 27/24 |
| Comparative example 2 | 170 | 62 | 72 | 514 | 16 | 20 | 23 | 42 | 65 | 88 | 4/−5 |

An examination of the wound shape of the screen is conducted by the following steps. The wound shape is evaluated by the "warpage" and the "curl in set state," which are described in more detail hereinafter. A visual examination is also carried out to judge whether any pressed mark exists or not.

The reflex-type screen 210 is cut into an examination sample piece having a size of 210 mm in the axial direction of the winding shaft 130 (the width direction of the refection type screen 210) and 300 mm in the pulling direction U, and the amount of the warpage is measured. One edge of the sample is jointed to the winding shaft. The sample is then distance is not constant on each side, a maximum value thereof is defined as the "warpage" in the certain amount of time.

The term "curl in set state" in this specification means an amount measured by the following steps. The curl in set state is measured with respect to both edges in the width direction of the reflex-type screen 210.

The manufactured reflex-type screen 210 is wound up by a winding shaft 130 having an external diameter of 35 mm and a width of 1,775 mm, and is secured with tape in order not to unroll during the examination. The reflex-type screen 210 is put into an examination tank with a temperature of 23 degrees and a relative humidity of 50% RH. The reflex-type screen 210 is left for 24 hours, and then taken out from the tank. The tape securing the screen is removed, and the reflex-type screen is set to the screen apparatus 100.

Figure 8:
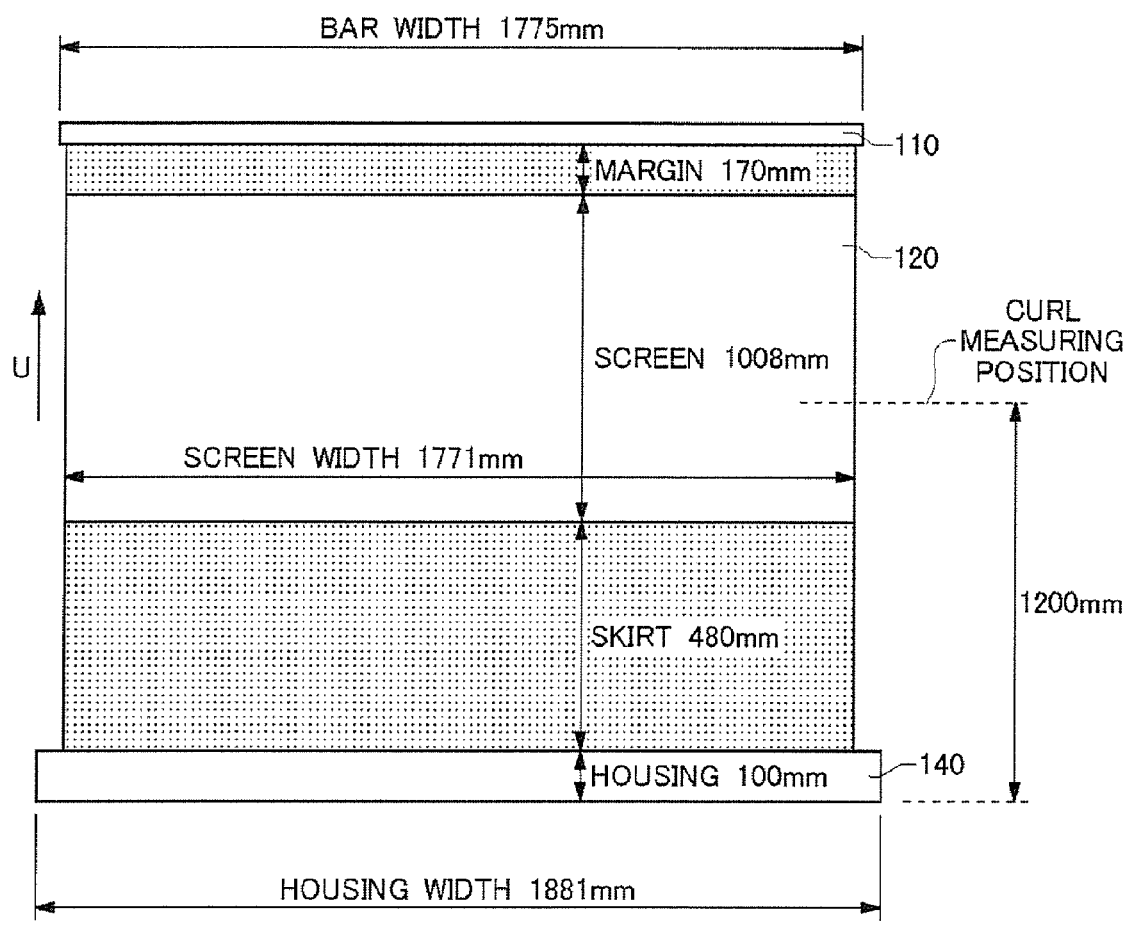
FIG. 8 is an elevation view of the screen apparatus for illustrating a method of measuring curl when the screen is set.

FIG. 8 is an elevation view of the screen apparatus 100 in which the reflex-type screen 210 is in "set state." When the reflex-type screen 210 is pulled out from the storing housing, the lower hem of the reflex-type screen 210 is positioned at 480 mm upward from the upper surface of the storing housing 140. In this state, the curl of both edges in the width direction of the screen (horizontal direction in the figure) is measured at the position of 1,200 mm upward from the lower surface of the storing housing 140.

Figure 9:
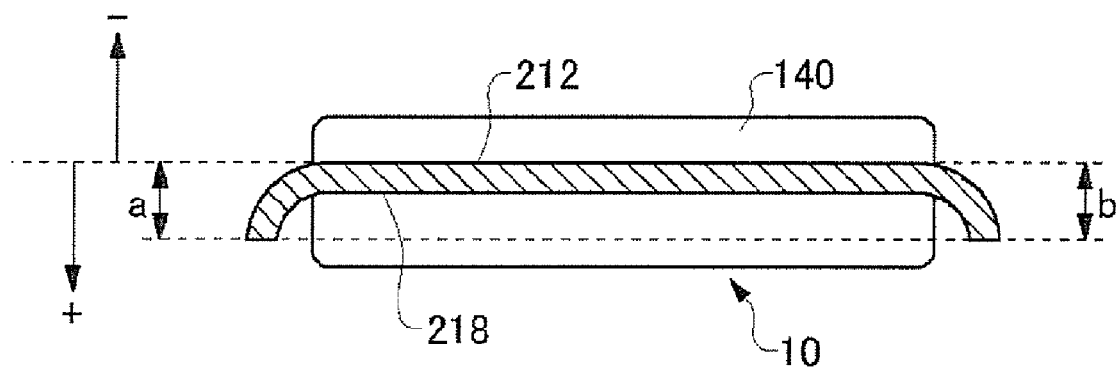
FIG. 9 is a top view of the screen apparatus for illustrating a method of measuring curl when the screen is set.

FIG. 9 is a top view of the screen apparatus 100 showing the curls a and b at both edges in the width direction of the reflex-type screen 210. As shown in the figure, when the reflex-type screen 210 is observed from one side of the screen apparatus 100, the maximum distance between the back surface protective layer 212 and either one of the right and left edges of the reflex-type screen 210 in the vertical direction in relation to the back surface protective layer 212 is defined as the "curl in set state." With respect to the center of the reflex-type screen 210, if the screen 210 warps in the direction of the surface protective layer 218 (the lower side of the figure), the distance value is positive, and if the screen warps in the direction of the back surface protective layer 212 (the upper side of the figure), the distance value is negative.

Embodiment 2

The reflection layer 236 made of an aluminum foil having a thickness of 7 μm is attached to the back surface protective layer 232 made of a PET film (manufactured by Toray Industries, Inc.) having a thickness of 25 μm. On the reflection layer 236, the surface protective layer 238 made of a PET film having a thickness of 113 μm and having an anti-glare treated surface is laminated to form the reflex-type screen 210. The surface protective layer 238 is formed by applying an acrylic resin dispersed with a plurality of acrylic beads having a particle size of 2-10 μm onto a PET film having a thickness of 100 μm (manufactured by Toray Industries, Inc.).

The back surface protective layer 232 is provided in such a way that the traverse direction of the PET film is congruent with the pulling direction U, and the surface protective layer 238 is provided in such a way that the traverse direction of the PET film is congruent with the pulling direction U. Moreover, the surface protective layer 238 is set so that a surface without ant-glare treatment is opposed to the reflection layer 236. The back surface protective layer 232, the reflection layer 236, and the surface protective layer 238 are made integral by dry-laminate treatment with urethane adhesives (manufactured by Toyo Ink Mfg. Co., Ltd.) applied evenly between respective layers.

Table 1 shows the loop stiffness values of the surface protective layer 238, the back surface protective layer 232, and the whole reflex-type screen 230 in the present embodiment. As shown in the table, the loop stiffness value of the surface protective layer 238 is higher than that of the back surface protective layer 232 in the present embodiment. The examination for wound shape of the screen is carried out in the same way as Embodiment 1.

COMPARATIVE EXAMPLE 1

The reflection layer 126 made of an aluminum foil having a thickness of 7 μm is attached to the back surface protective layer 122 made of a PET film (manufactured by Toray Industries, Inc.) having a thickness of 125 μm. On the reflection layer 126, the surface protective layer 128 made of an OPP film (manufactured by Toray Industries, Inc.) having a thickness of 20 μm is laminated to form the reflex-type screen 120. The back surface protective layer 122 is provided in such a way that the traverse direction of the PET film is congruent with the pulling direction U, and the surface protective layer 128 is provided in such a way that the traverse direction of the OPP film is congruent with the pulling direction U. The back surface protective layer 122, the reflection layer 126, and the surface protective layer 128 are made integral by dry-laminate treatment with urethane adhesives (manufactured by Toyo Ink Mfg. Co., Ltd.) applied evenly between respective layers.

Table 1 shows the loop stiffness values of the surface protective layer 128, the back surface protective layer 122, and the whole reflex-type screen 120 in the present comparative example. The loop stiffness value of the back surface protective layer 122 is less than a lower limit value, and thus it cannot be measured. As shown in the table, the loop stiffness value of the surface protective layer 128 is lower than that of the back surface protective layer 122 in the present comparative example. The examination for wound shape of the screen is carried out in the same way as Embodiment 1.

COMPARATIVE EXAMPLE 2

The reflection layer 216 made of an aluminum foil having a thickness of 7 μm is attached to the back surface protective layer 212 made of a PET film (manufactured by Toray Industries, Inc.) having a thickness of 75 μm. On the reflection layer 216, the surface protective layer 218 made of a PET film (manufactured by Toray Industries, Inc.) having a thickness of 75 μm, and having a sand-mat treated surface to form the reflex-type screen 210. The back surface protective layer 212 is provided in such a way that the traverse direction of the PET film is congruent with the pulling direction U, and the surface protective layer 218 is provided in such a way that the traverse direction of the PET film is congruent with the pulling direction U. Moreover, the surface protective layer 218 is set so that a surface without sand-mat treatment is opposed to the reflection layer 216. The back surface protective layer 212, the reflection layer 216, and the surface protective layer 218 are made integral by dry-laminate treatment with urethane adhesives (manufactured by Toyo Ink Mfg. Co., Ltd.) applied evenly between respective layers.

Table 1 shows the loop stiffness values of the surface protective layer 218, the back surface protective layer 212, and the whole reflex-type screen 210 in the present comparative example. As shown in the table, the loop stiffness value of the surface protective layer 218 is lower than that of the back surface protective layer 212. The examination for wound shape of the screen is carried out in the same way as Embodiment 1.

Figure 10:
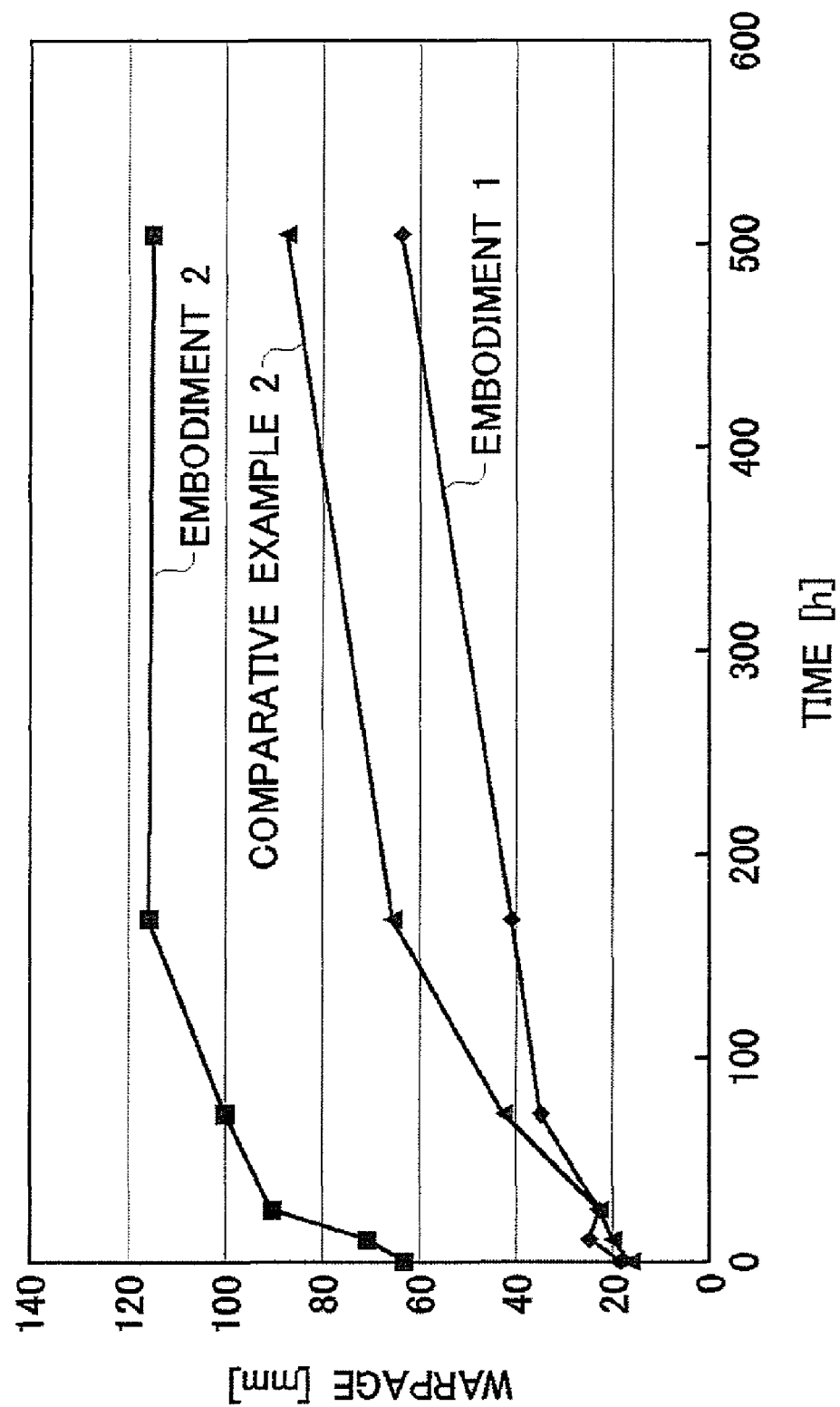
FIG. 10 shows a result of an examination for wound shape of the screen.

Table 1 and FIG. 10 show the results of the examination for the wound shape of the screen. As shown therein, the reflex-type screen 210 in Embodiment 1 has a low value of curl in set state and a low warpage after letting it stand for 504 hours in the examination tank. That is, the reflex-type screen 210 is capable of retaining the flatness. Moreover, no pressed mark is observed. Because the reflex-type screen 210 in Embodiment 1 is thin, and the loop stiffness value of the whole screen is lower than those of Comparative Examples 1 and 2, it is easy to wind up the screen and the wound roll has a small external diameter.

The reflex-type screen 230 in Embodiment 2 also has a low value of curl in set state, and a low warpage after letting it stand for 504 hours in the examination tank. That is, the reflex-type screen 230 is capable of retaining the flatness. Moreover, no pressed mark is observed. Because the reflex-type screen 230 in Embodiment 2 is thin, and the loop stiffness value of the whole screen is lower than those of Comparative Examples 1 and 2, it is easy to wind up the screen and the wound roll has a small external diameter.

The reflex-type screen 120 in Comparative Example 1, on the other hand, curls up after letting it stand only for one hour in the examination tank, and therefore the warpage cannot be measured. The curl value in set state is also high. Moreover, the loop stiffness value of the whole reflex-type screen 120 is higher than those of the screens in Embodiments 1 and 2, therefore it is harder to wind up the screen in Comparative Example 1.

The reflex-type screen 210 in Comparative Example 2 has a relatively low value of curl in set state and a low warpage amount after letting it stand for 504 hours in the examination tank. The flatness of the screen is comparatively retained, and no pressed mark is observed. However, because the screen 210 in Comparative Example 2 is thick, and the loop stiffness value of the whole screen is higher than those of the screens in Embodiments 1 and 2, it is harder to wind up the screen. The external diameter of the wound roll is also larger than those in Embodiments 1 and 2, when wound up with the same torque.

As described the above, the reflex-type screens in Embodiments 1 and 2 are thin, and can be easily wound up. The flatness of the screen is also retained effectively when the screens are unrolled from the winding shaft.

While the present invention has been described with the embodiments, the technical scope of the invention is not limited to the above described embodiments. It is apparent to persons skilled in the art that various alternations and improvements can be made to the above-described embodiments. It is apparent from the claims that the embodiments with such alternations or improvements are within the technical scope of the invention.

Specifically, in the above embodiments, although an illustrative reflex-type screen is described as one aspect of the present invention, the technical scope of the invention is not so limited. The present invention may be applied to a screen-like or a sheet-like article or a product that may assume a rolled state or an unrolled state.

The execution order of processes such as operations, procedures, and steps in an apparatus, a system, a program, and a method described in the claims, the specification and the drawings is not explicitly described such as by using terms "before" or "prior to". Therefore, it shall be understood that the invention may be realized in a random order, unless an output of the prior process is used in the successive process. Furthermore, even if any description herein includes the expressions "firstly", "secondly" and the like for convenience, it should not be construed that the indicated order is an absolute requirement for the implementation.

What is claimed is:

1. A reflex-type screen which is wound up by a shaft to be retracted and is unwound from the shaft while in use, comprising:
   a reflection layer which reflects an incident light;
   a transparent surface protective layer laminated on a first surface of the reflection layer; and
   a back surface protective layer laminated on a second surface of the reflection layer,
   wherein, as between the surface protective layer and the back surface protective layer, the one that has a higher loop stiffness value, faces inward when the reflex-type screen is wound up by the shaft.

2. The reflex-type screen as set forth in claim 1, wherein the loop stiffness value of the surface protective layer is higher than that of the back surface protective layer.

3. The reflex-type screen as set forth in claim 2, wherein the back surface protective layer and the surface protective layer are formed by the same material, and the surface protective layer is thicker than the back surface protective layer.

4. The reflex-type screen as set forth in claim 2, wherein the surface protective layer includes a light diffusion material.

5. The reflex-type screen as set forth in claim 2, wherein the surface protective layer has a transparent main body and an anti-glare layer which diffuses light, and the transparent main body is provided closer to the reflective layer than the anti-glare layer is provided on the reflection layer.

6. The reflex-type screen as set forth claim 2, wherein the surface protective layer has an exposing surface which is mat treated.

7. The reflex-type screen as set forth in claim 2, wherein the surface protective layer has a transparent main body and a light diffusion film which diffuses a light, and the transparent main body is provided closer to the reflective layer than the anti-glare layer is provided on the reflection layer.

8. The reflex-type screen as set forth in claim 1, wherein the reflection layer is made of metal.

9. A screen apparatus comprising:
   a shaft; and
   a reflex-type screen which is wound up by the shaft to be retracted and is unwound from the shaft while in use, wherein
   the reflex-type screen includes:
   a reflection layer which reflects an incident light;
   a transparent surface protective layer laminated on a first surface of the reflection layer; and
   a back surface protective layer laminated on a second surface of the reflection layer,
   wherein as between the surface protective layer and the back surface protective layer, the one that has a higher loop stiffness value, faces inward when the reflex-type screen is wound up by the shaft.

10. The screen apparatus as set forth in claim 9, wherein the shaft has an outer circumferential surface portion which is jointed with the reflex-type screen, the outer circumferential surface portion being formed by cutting the shaft away to a depth approximately equal to the thickness of the reflex-type screen.

* * * * *